(12) United States Patent
Jo et al.

(10) Patent No.: US 10,622,631 B2
(45) Date of Patent: Apr. 14, 2020

(54) NEGATIVE ACTIVE MATERIAL, LITHIUM SECONDARY BATTERY INCLUDING THE MATERIAL, AND METHOD OF MANUFACTURING THE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Sungnim Jo, Seoul (KR); Kyueun Shim, Daejeon (KR); Sewon Kim, Suwon-si (KR); Jongseok Moon, Suwon-si (KR); Kanghee Lee, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 65 days.

(21) Appl. No.: 15/684,135

(22) Filed: Aug. 23, 2017

(65) Prior Publication Data

US 2018/0097229 A1 Apr. 5, 2018

(30) Foreign Application Priority Data

Sep. 30, 2016 (KR) .................. 10-2016-0127143

(51) Int. Cl.
*H01M 4/583* (2010.01)
*H01M 4/133* (2010.01)
(Continued)

(52) U.S. Cl.
CPC ......... *H01M 4/583* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/366* (2013.01); *H01M 4/386* (2013.01); *H01M 4/587* (2013.01); *H01M 4/62* (2013.01); *H01M 4/625* (2013.01); *H01M 10/0525* (2013.01); *C01B 32/158* (2017.08); *C01B 32/182* (2017.08); *C01B 32/20* (2017.08);
(Continued)

(58) Field of Classification Search
None
See application file for complete search history.

(56) References Cited

U.S. PATENT DOCUMENTS 6,350,544 B1 2/2002 Takami et al.
8,828,103 B2 9/2014 Zaghib et al.
(Continued)

FOREIGN PATENT DOCUMENTS

JP 3897709 B2 1/2007
KR 1020100007236 A 1/2010
(Continued)

*Primary Examiner* — Sarah A. Slifka
(74) *Attorney, Agent, or Firm* — Cantor Colburn LLP

(57) ABSTRACT

A negative active material including: a porous silicon-carbon secondary particle including: a plurality of silicon-carbon primary particles including a plurality of silicon-carbon primary particles including a silicon material, and a first carbonaceous material, wherein an apparent density of a silicon-carbon primary particle of the plurality of silicon-carbon primary particles is about 2 grams per cubic centimeter or greater; and a second carbonaceous material, wherein the second carbonaceous material is disposed on the plurality of silicon-carbon primary particles.

23 Claims, 11 Drawing Sheets

(51) Int. Cl.

| | | |
|---|---|---|
| *H01M 4/36* | (2006.01) | |
| *H01M 4/1393* | (2010.01) | |
| *H01M 4/1395* | (2010.01) | |
| *H01M 4/134* | (2010.01) | |
| *H01M 4/587* | (2010.01) | |
| *H01M 4/04* | (2006.01) | |
| *H01M 4/62* | (2006.01) | |
| *H01M 4/38* | (2006.01) | |
| *H01M 10/0525* | (2010.01) | |
| *H01M 4/02* | (2006.01) | |
| *H01M 10/052* | (2010.01) | |
| *C01B 32/182* | (2017.01) | |
| *C01B 32/158* | (2017.01) | |
| *C01B 32/20* | (2017.01) | |
| *H01M 4/66* | (2006.01) | |

(52) U.S. Cl.
CPC ............ *H01M 4/66* (2013.01); *H01M 10/052* (2013.01); *H01M 2004/027* (2013.01)

(56) References Cited

U.S. PATENT DOCUMENTS

| | | |
|---|---|---|
| 2011/0097629 A1 | 4/2011 | Yew et al. |
| 2011/0121240 A1 | 5/2011 | Amine et al. |
| 2015/0118567 A1 | 4/2015 | Chen |

FOREIGN PATENT DOCUMENTS

| | | |
|---|---|---|
| KR | 101049829 B1 | 7/2011 |
| KR | 1020140082045 A | 7/2014 |
| KR | 1020150047274 A | 5/2015 |
| KR | 1020150072319 A | 6/2015 |

[Si/C primary particles]   [Si/C secondary particles]

NEGATIVE ACTIVE MATERIAL, LITHIUM SECONDARY BATTERY INCLUDING THE MATERIAL, AND METHOD OF MANUFACTURING THE MATERIAL

CROSS-REFERENCE TO RELATED APPLICATION

This application claims priority to and the benefit of Korean Patent Application No. 10-2016-0127143, filed on Sep. 30, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a negative active material, a lithium secondary battery including the negative active material, and a method of preparing the negative active material.

2. Description of the Related Art

When used as a negative active material, graphite can have the problem of low capacity, e.g., a theoretical capacity of about 370 mAh/g. A high-capacity negative active material including a silicon-carbon composite is known. The combination of good charge storage capacity, e.g., a theoretical capacity of about 4,200 mAh/g, good electrical conductivity, and desirable physical properties, make silicon-carbon composites attractive alternatives to graphite. Silicon-carbon composites may also offset the performance deterioration observed in silicon negative active materials, including low electrical conductivity and volume expansion instability.

Currently, a silicon-carbon composite may exhibit negative electrode deterioration due to a volumetric change resulting from a reaction between lithium (Li) and silicon (Si) in the silicon-carbon composite. This presents a problem for devices that rely on batteries for a long duration of operation, such as in electric vehicles, where the negative electrode materials may become unreliable.

For example, in a silicon-carbon composite having a structure with nanosilicon particles adhered to the surface of carbon, repeated volumetric changes of the silicon may cause separation of the silicon from the carbon such that Li ions and electrons may lose their migration pathways and the silicon may no longer be involved in storing Li ions. This may lead to a reduction in capacity with repeated charge and discharge cycles. Thus there remains a need for an improved negative active material.

SUMMARY

Provided is a negative active material that may reduce an electrode expansion ratio and may improve lifespan characteristics of a lithium secondary battery.

Provided is a lithium secondary battery including the negative active material.

Provided is a method of preparing the negative active material.

Additional aspects will be set forth in part in the description which follows and, in part, will be apparent from the description, or may be learned by practice of the presented embodiments.

According to an embodiment, disclosed is a negative active material including: a porous silicon-carbon secondary particle including a plurality of silicon-carbon primary particles including a silicon-material, and a first carbonaceous material, wherein an apparent density of a silicon-carbon primary particle of the plurality of silicon-carbon primary particles is about 2 grams per cubic centimeter or greater; and a second carbonaceous material, wherein the second carbonaceous material is disposed on the plurality of silicon-carbon primary particles.

In an embodiment, the silicon-carbon primary particle may have a porosity of less than about 10%, based on a total volume of the silicon carbon primary particle.

In an embodiment, the silicon-carbon primary particle may have an average pore diameter of about 5 nanometers to about 2 micrometers.

In an embodiment, the silicon-carbon primary particles may have a specific surface area of about 6 square meters per gram to about 70 square meters per gram.

In an embodiment, an apparent density of the silicon-carbon secondary particle may be less than the apparent density of the silicon-carbon primary particle, and the apparent density of the silicon-carbon secondary particle may be about 1.6 grams per cubic centimeter or greater.

In an embodiment, the silicon-carbon secondary particle may have a porosity of about 20 weight percent to about 50 weight percent.

In an embodiment, the silicon-carbon secondary particle may have a specific surface area of about 3 square meters per gram to about 20 square meters per gram.

In an embodiment, the silicon-carbon primary particle may have an average particle diameter of about 0.1 micrometers to about 15 micrometers, and the silicon-carbon secondary particle may have an average particle diameter of about 5 micrometers to about 25 micrometers.

In an embodiment, an amount of silicon in the silicon-carbon primary particle may be about 50 weight percent to about 99 weight percent, based on a total weight of the silicon-carbon primary particle, and the amount of silicon in the silicon-carbon secondary particle may be about 30 weight percent to about 70 weight percent, based on a total weight of the silicon-carbon secondary particle.

In an embodiment, the silicon material may have a nanostructure including silicon, and the nanostructure may be in the form of nanoparticles, nanowires, nanorods, nanofibers, nanoporous bodies, nanotemplates, and nanoneedles, or a combination thereof.

In an embodiment, the first carbonaceous material and the second carbonaceous material may each independently include crystalline carbon, amorphous carbon, or a combination thereof.

In an embodiment, the crystalline carbon may include natural graphite, artificial graphite, expandable graphite, graphene, carbon nanotubes, or a combination thereof.

In an embodiment, the negative active material may further include a coating layer on a surface of the silicon-carbon secondary particle.

In an embodiment, the coating layer may include a fluoride compound, an inorganic oxide, a phosphate compound, or a combination thereof.

In an embodiment, the coating layer may include LiF, $AlF_3$, $AlPO_4$, $Li_3AlF_6$, $Al_2O_3$, $ZrO_2$, $ZnO_2$, $TiO_2$, $SnO_2$, $AlPO_4$, or a combination thereof.

In an embodiment, an amount of the coating layer may be about 0.1 parts to about 5 parts by weight, based on 100 parts by weight of the silicon-carbon secondary particle.

In an embodiment, the silicon-carbon secondary particle has a structure in which the silicon-carbon primary particle is dispersed in the second carbonaceous material.

According to an embodiment, a lithium secondary battery includes the negative active material.

According to an embodiment, disclosed is a method of preparing a negative active material, the method including: contacting contacting a silicon material and a first carbonaceous material to form silicon-carbon primary particle having an apparent density of about 2 grams per cubic centimeter or greater; thermally treating the silicon-carbon primary particle, a second carbonaceous material, and a foaming agent to form a porous silicon-carbon secondary particle, wherein the silicon-carbon secondary particle includes a plurality of the silicon-carbon primary particles and the second carbonaceous material.

In an embodiment, the foaming agent may include citric acid, stearic acid, oleic acid, oxalic acid, adipic acid, salicylic acid, benzoic acid, monochloroacetic acid, dibutyl phthalate (DBP), dioctyl phthalate (DOP), ethylene carbonate (EC), propylene carbonate (PC), petroleum pitch, coaltar pitch, or a combination thereof.

In an embodiment, the thermal treating may be performed at about 500° C. to about 1,000° C.

In an embodiment, the method may further include forming a coating layer on a surface of the silicon-carbon secondary particle.

In an embodiment, the silicon-carbon primary nanoparticle has a porosity of less than about 10%, based on a total volume of the silicon carbon primary particle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
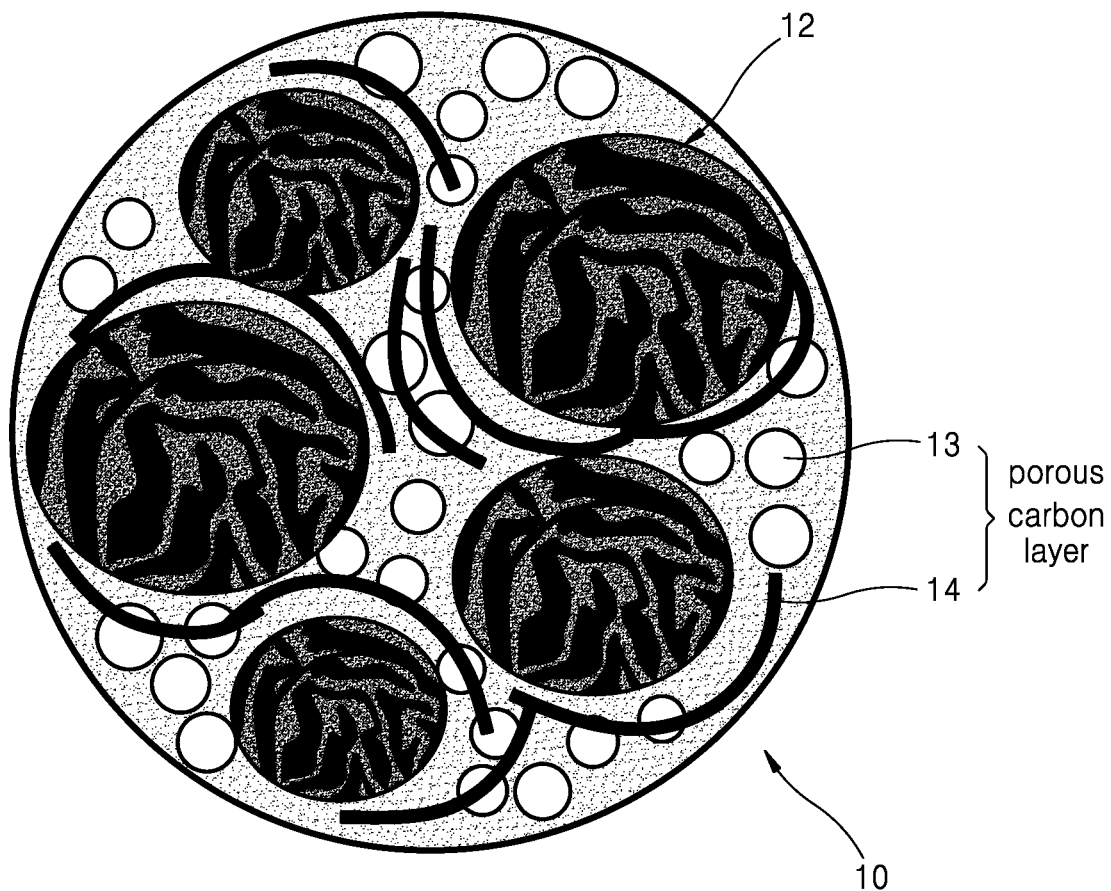
FIG. 1 is a schematic illustration of a structure of an embodiment of a negative active material.

Reference will now be made in detail to embodiments of a negative active material, a lithium secondary battery including the negative active material, and a method of preparing the negative active material, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In a silicon-carbon composite, carbon used to support an active material may not effectively suppress volume expansion resulting from a reaction of silicon with lithium. This can result in deterioration of the electrode.

According to an aspect of the present disclosure, a negative active material includes: a silicon-carbon secondary particle including a plurality of silicon-carbon primary particles including a silicon-based material and a first carbonaceous material wherein an apparent density a silicon-carbon primary particle of the plurality of silicon-carbon primary particles is about of about 2 grams per cubic centimeter (g/cc) or greater; and a second carbonaceous material, wherein the second carbonaceous material is porous, and wherein the second carbonaceous material is disposed on the plurality of silicon-carbon primary particles.

Figure 2:
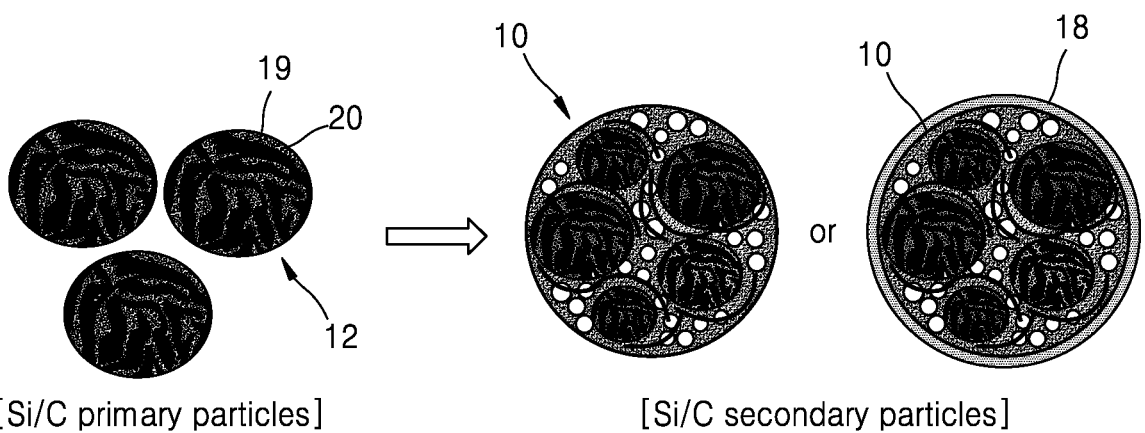
FIG. 2 is a schematic illustration of an embodiment of a process of preparing a negative active material.

FIGS. 1 and 2 are schematic illustrations of a structure of a negative active material according to an embodiment and a process of preparing of the same, respectively.

Referring to FIGS. 1 and 2, the negative active material according to an embodiment may include a silicon-carbon secondary particle 10 (hereinafter, also referred to as "Si/C secondary particles") having a compact-porous composite structure including a composite of silicon-carbon primary particles 12 (hereinafter, also referred to as "Si/C primary particles") and a second carbonaceous material 14, for example a porous carbon layer. The silicon-carbon secondary particle may comprise a pore 13. The Si/C primary particles 12 having a compact structure and comprise a silicon-based material 19 and a first carbonaceous material 20. The negative active material may further include a coating layer 18 on a surface of the silicon-carbon secondary particles 10.

As used herein, "the silicon-carbon secondary particles" and "the plurality of silicon-carbon secondary particles" are used interchangeably and share the same meaning. The terms "a silicon-carbon secondary particle" and "a silicon-carbon secondary particle of the plurality of silicon-carbon secondary particles" are used interchangeably and mean one or more silicon-carbon secondary particles.

As used herein, "the silicon-carbon primary particles" and "the plurality of silicon-carbon primary particles" are used interchangeably and share the same meaning. The terms "a silicon-carbon primary particle" and "a silicon-carbon primary particle of the plurality of silicon-carbon primary particles" are used interchangeably and mean one or more silicon-carbon primary particles.

In order to describe a structure of a negative active material according to an embodiment, magnified scanning electron microscope (SEM) images at 25,000× magnification and 100,000× magnification of inner cross-sections of a negative active material of Example 1, sliced by focused ion beam bombardment (FIB), are respectively presented in FIGS. 3A and 3B, and will be described.

Figure 3A:
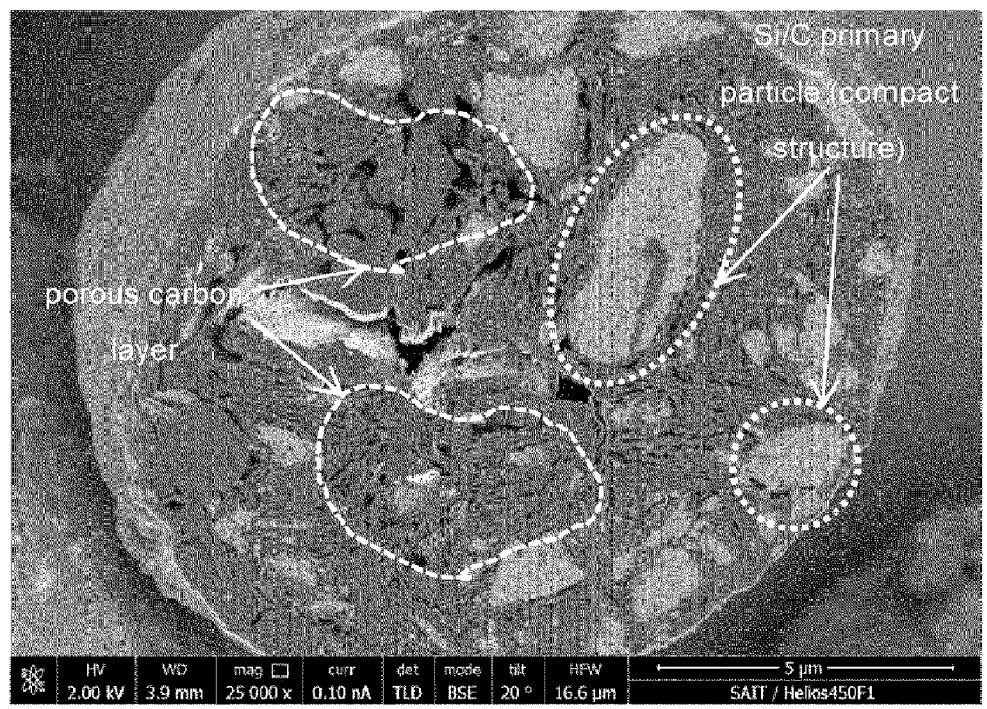
FIG. 3A is an scanning electron microscope (SEM) image at 25,000× magnification of an inner cross-section of a negative active material of Example 1, sliced by focused ion beam bombardment (FIB), for describing a structure of the negative active material according to an embodiment.
Figure 3B:
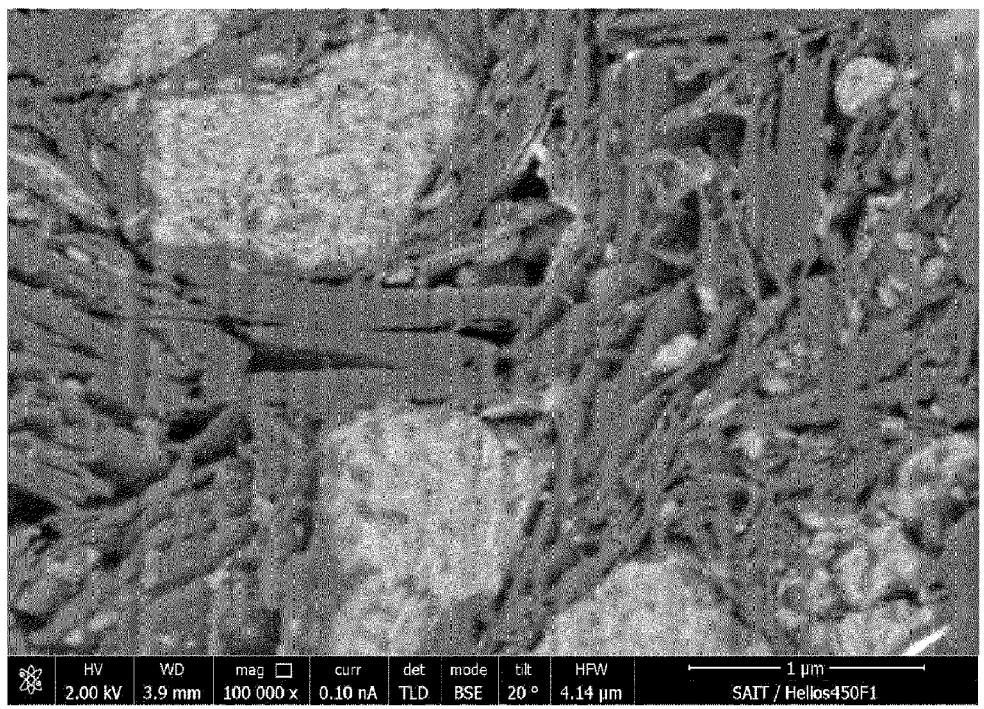
FIG. 3B is an SEM image at 100,000× magnification of the inner cross-section of the negative active material of Example 1, cut by FIB, for describing the structure of the negative active material according to an embodiment.

Referring to FIGS. 3A and 3B, a silicon-carbon secondary particle 10 is found to have a structure including silicon-carbon primary particles 12 having a compact structure and buried and dispersed in a second carbonaceous material 14, for example a porous carbon layer. The silicon-carbon primary particles 12 may have such a compact structure, while the silicon-carbon secondary particle 10 including the silicon-carbon primary particles 12 has a porous structure of high porosity.

The silicon-carbon primary particles may have a Si/C compact structure to improve electrical conductivity of the silicon-based material and to maintain an electromigration pathway even with a volume change, thus improving charge and discharge efficiency and lifespan characteristics of a lithium secondary battery.

The silicon-carbon secondary particle, which is a product of granulation of the silicon-carbon primary particles having a compact structure with the second carbonaceous material, may have a compact-porous composite structure. A porous structure of the silicon-carbon secondary particle may secure space to withstand expansion of the silicon-carbon primary particles, and reduce an electrode expansion ratio.

The silicon-carbon primary particles of a negative active material according to an embodiment will now be described.

The silicon-carbon primary particles may have a compact structure including a silicon-based material and a first carbonaceous material. The silicon-carbon primary particles can have an apparent density of about 2 grams per cubic centimeter (g/cc) or greater, e.g., an apparent density of about 2 g/cc to about 2.3, or about 2.1 g/cc to about 2.2 g/cc.

As used herein, the term "silicon-based" of the silicon-based material is synonymous with "silicon material" and may refer to a material including at least about 50 weight percent (wt %) of silicon (Si). For example, the silicon-based material may include at least about 60 wt %, at least about 70 wt %, at least about 80 wt %, or at least about 90 wt % of Si, or about 100 wt % of Si, e.g., about 50 wt % to about 100 wt %, about 60 wt % to about 95 wt %, or about 70 wt % to about 90 wt %. The silicon-based material may include crystalline (monocrystalline or polycrystalline) silicon, amorphous silicon, or a combination thereof.

The silicon-based material may comprise a nanostructure including Si, wherein the form of the nanostructure may be in the form of a nanoparticle, a nanowire, a nanorod, a nanofiber, a nanoporous body, a nanotemplate, nanoneedle, or a combination thereof. At least one of the dimensions, i.e., a length, a diameter, or a width of the silicon-based material may be nano-sized, that is, has a nanometer scale dimension.

In an embodiment, the silicon-based material may include silicon-based nanoparticle. The silicon-based nanoparticle may have an average particle diameter at a scale of nanometers, and is not particularly limited, for example, about 500 nanometers (nm). In an embodiment, the silicon-based nanoparticles may have an average particle diameter of about 1 nm to about 500 nm, and in another embodiment, about 50 nm to about 150 nm, and in still another embodiment, about 90 nm to about 110 nm.

As used herein, the term "carbonaceous," for example when describing the first carbonaceous material, may refer to a material including at least about 50 wt % of carbon. For example, the first carbonaceous material may include at least about 60 wt %, at least about 70 wt %, at least about 80 wt %, or at least about 90 wt % of carbon, or about 100 wt % of carbon, e.g., about 50 wt % to about 100 wt %, about 60 wt % to about 95 wt %, or about 70 wt % to about 90 wt % carbon. The first carbonaceous material may include a crystalline carbon, an amorphous carbon, or a combination thereof.

Non-limiting examples of the crystalline carbon are natural graphite, artificial graphite, expandable graphite, graphene, carbon black, fullerene soot, or a combination thereof. Examples of natural graphite, which is naturally occurring graphite, are flake graphite, highly crystalline graphite, microcrystalline graphite, cryptocrystalline (amorphous) graphite, and the like. Examples of artificial graphite, which is artificially synthesized, for example by heating amorphous carbon at a high temperature, are primary graphite, electrographite, secondary graphite, graphite fiber, and the like. Expandable graphite is graphite with vertically expanded molecular layers obtained, for example, by intercalating a chemical compound, such as an acid or an alkali, between the molecular layers of the graphite and heating the same. Graphene may be single-layered or multilayered. Carbon black is a crystalline material having a structure which is less ordered as compared with graphite. Carbon black may be changed into graphite, for example, when heated at about 3,000° C. for a long time. Fullerene soot is a carbon mixture including at least about 3 wt % of fullerene as a polyhedral bundle compound having 60 or more carbon atoms. The first carbonaceous material may include one of these crystalline carbonaceous materials alone or a combination of at least two thereof. For example, the first carbonaceous material may be natural graphite or artificial graphite. The crystalline carbon may be in spherical, planar, fibrous, tubular, or powder form.

For example, the amorphous carbon may include soft carbon, hard carbon, a pitch carbide, a mesophase pitch carbide, a sintered cork, a polymer carbide, or a combination thereof. For example, the amorphous carbon may be obtained by carbonizing a carbon precursor through thermal treatment, such as coal-tar pitch, mesophase pitch, petroleum pitch, coal-tar oil, intermediate crude oil (petroleum), organic synthetic pitch, or a polymer resin such as phenol resin, furan resin, or polyimide resin. The thermal treatment temperature for the carbonization may be adjusted to be within a range of about 500° C. to about 1,400° C. For example, to lower the degree of crystallinity of Si, the thermal treatment temperature may be in a range of about 500° C. to about 950° C.

When a combination of crystalline carbon and amorphous carbon is used as the first carbonaceous material, the crystalline carbon may be mixed with a carbon precursor, for example, coal-tar pitch, mesophase pitch, petroleum pitch, coal-tar oil, intermediate crude oil (petroleum), organic synthetic pitch, or a polymer resin such as phenol resin, furan resin, or polyimide resin, and then carbonized into amorphous carbon through thermal treatment.

Any suitable combination of the foregoing carbons may be used.

The amount of silicon in the silicon-carbon primary particles may be about 50 wt % to about 99 wt %, and in an embodiment, about 55 wt % to about 85 wt %, and in another embodiment, about 60 wt % to about 80 wt %, based on the total weight of the silicon-carbon primary particles. When the amount of silicon is within these ranges, the negative active material may exhibit high-capacity characteristics.

The silicon-carbon primary particles may have a compact structure which may be obtained using a pressing process, and may have an apparent density of about 2 g/cc or greater and porosity of less than about 10%, based on a total volume of the silicon carbon primary particle.

An apparent density refers to the density of a porous structure in which the volume of closed pores is included, i.e., the ratio of the mass to a total volume of the porous structure including solid parts and closed pores, and is also called volume density or particle density in the technological field relating to granular materials. The silicon-carbon primary particles may have an apparent density of about 2 g/cc or greater, and in an embodiment, about 2.0 g/cc to about 2.3 g/cc, and in another embodiment, about 2.0 g/cc to about 2.2 g/cc. When the apparent density of the silicon-carbon primary particles is within these ranges, the silicon-carbon primary particles may have a compact structure, and thus may improve initial capacity efficiency and lifespan characteristics of a lithium secondary battery.

The silicon-carbon primary particles may have porosity of less than about 10%, based on a total volume of the silicon carbon primary particle.

Porosity refers to the fraction of the volume of pores (voids) in a material as compared with its total volume, and may be measured using a gas adsorption method (based on the Brunauer-Emmet-Teller (BET) model) or mercury porosimetry. The gas adsorption method (BET) is for measuring porosity of a sample and the size and distribution of pores thereof by gas adsorption (typically with nitrogen gas) to the sample, and thus may even be used to analyze closed micropores. When using mercury porosimetry, porosity of a sample may be derived based on the relationship between pressure and mercury volume resulting from the intrusion of mercury into the pores of the sample, according to JIS R 1655, "Test methods for pore size distribution of fine ceramic green body by mercury intrusion porosimetry (MIP)," the content of which is incorporated herein in its entirety by reference.

The silicon-carbon primary particles may be pressed to have porosity of less than about 10%. The silicon-carbon primary particles may have porosity of greater than 0% to less than about 10%, and in an embodiment, about 1% or greater to about 8% or less, and in another embodiment, about 2% or greater to about 6% or less. When the porosity of the silicon-carbon primary particles is within these ranges, the silicon-carbon primary particles may have a compact structure to improve the initial capacity efficiency and lifespan characteristics of a lithium secondary battery.

The pore size distribution or specific surface area of the silicon-carbon primary particles is not particularly limited provided that the porosity of the silicon-carbon primary particles is within the above-described ranges. For example, a pore size, i.e., an average pore diameter of the silicon-carbon primary particles may be less than about 500 nm, and in an embodiment, about 100 nm to about 450 nm. The silicon-carbon primary particles may have a specific surface area of about 6 square meters per gram ($m^2/g$) to about 70 $m^2/g$, for example, about 20 $m^2/g$ to about 60 $m^2/g$. When the pore size and the specific surface area of the silicon-carbon primary particles are within these ranges, a lithium secondary battery may have further improved initial capacity efficiency and lifespan characteristics. The pore size and the specific surface area of the particles may be measured by the gas adsorption method (BET) or mercury porosimetry.

The silicon-carbon primary particles may have an average particle diameter of about 0.1 micrometers ($\mu m$) to about 15 $\mu m$, and in an embodiment, about 0.5 $\mu m$ to about 10 $\mu m$, and in another embodiment, about 1 $\mu m$ to about 5 $\mu m$. The average particle diameter represents (D50) indicates a diameter corresponding to 50 volume percent (i.e., the particle diameter or median diameter at a 50% cumulative volume) in a cumulative particle size distribution measured by laser diffraction. When the average particle diameter of the silicon-carbon primary particles is within the above-described ranges, the electrical conductivity of the silicon may be improved, and electromigration pathways may be maintained with volume changes.

Hereinafter, the silicon-carbon secondary particles of negative active materials according to an embodiment will now be described.

The silicon-carbon secondary particles, which are composite secondary particles of the compact-structured silicon-carbon primary particles and a second carbonaceous material, may have a compact-porous composite structure.

The amount of silicon in the silicon-carbon secondary particles may be about 30 wt % to about 70 wt %, and in an embodiment, about 30 wt % to about 60 wt %, and in another embodiment, about 40 wt % to about 50 wt %, based on the total weight of silicon-carbon secondary particles. When the silicon-carbon primary particles and the second carbonaceous material are combined at a ratio such that silicon content is within the above-described ranges, high-capacity characteristics may be attainable.

The second carbonaceous material may include crystalline carbon, amorphous carbon, or a combination thereof. The above-described example materials of the first carbonaceous material may apply to the second carbonaceous material. The second carbonaceous material may include the same or a different material from the first carbonaceous material. The second carbonaceous material may the in the form of a layer.

For example, the second carbonaceous material may include a combination of crystalline carbon and amorphous carbon. The amorphous carbon may serve as a protective shell of the crystalline carbon, and thus may further improve lifespan characteristics.

The silicon-carbon secondary particles may have a smaller apparent density and a greater porosity as compared with the apparent density and porosity of the silicon-carbon primary particles, due to the inclusion of the second carbonaceous material together with the compact-structured silicon-carbon primary particles in the silicon-carbon secondary particles. The silicon-carbon secondary particles may have an apparent density of about 1.6 g/cc or greater, and in an embodiment, about 1.6 g/cc to about 2.0 g/cc, and in another embodiment, about 1.7 g/cc to about 1.9 g/cc.

The silicon-carbon secondary particles may have porosity of about 20% to about 50%, and in an embodiment, about 25% or greater to about 45% or less, and in another embodiment, about 30% or greater to about 40% or less. When the apparent density and the porosity of the silicon-carbon secondary particles are within these ranges, the silicon-carbon secondary particles may form a porous structure and have space to tolerate/withstand the expansion of the silicon-carbon primary particles.

The silicon-carbon secondary particles may have a specific surface area of about 3 $m^2/g$ to about 20 $m^2/g$. When the specific surface area of the silicon-carbon secondary particles is within this range, lifespan characteristics of a lithium secondary battery may effectively be improved.

The silicon-carbon secondary particles may have an average particle diameter of about 5 $\mu m$ to about 25 $\mu m$, and in an embodiment, about 6 $\mu m$ to about 22 $\mu m$, and in another embodiment, about 10 $\mu m$ to about 20 $\mu m$. The average particle diameter (D50) indicates a diameter corresponding to 50 volume percent (i.e., the particle diameter or median diameter at a 50% cumulative volume) in a cumulative particle size distribution measured by laser diffraction. When the average particle diameter of the silicon-carbon secondary particles is within the above-described ranges, a negative electrode mixture may have an increased density.

The negative active material may further include a coating layer on a surface of the silicon-carbon secondary particles. The coating layer may serve as a protective layer of the surface of the silicon-carbon secondary particles and suppress a side reaction with an electrolyte solution, and may also form a stable secondary electrolyte interphase (SEI) layer, to thereby improve lifespan characteristics of a lithium secondary battery.

A material of the coating layer as a protective layer may be any suitable material able to form a hard, stable film having a high density and conductive of lithium ions. The coating layer may include, for example, a fluoride compound, a metal oxide, a metal nitride, a phosphate compound, or a combination thereof. For example, the fluoride compound may be $LiF$, $AlF_3$, or $Li_3AlF_6$. For example, the metal oxide or metal nitride may be an oxide or nitride of Li, Al, Sn, Ca, Sc, Ti, V, Cr, Mn, Fe, Co, Ni, Cu, Zn, Sr, Y, Zr, Nb, Ba, Lu, Hf, Ta, a lanthanide, or a combination thereof. For example, the metal oxide or metal nitride may be $Al_2O_3$, $ZrO_2$, $ZnO_2$, $TiO_2$, $SnO_2$, or a combination thereof. The phosphate compound may be, for example, $AlPO_4$. However, embodiments are not limited thereto.

The amount of the coating layer may be about 0.1 parts to about 5 parts by weight based on 100 parts by weight of the silicon-carbon secondary particles. For example, the amount of the coating layer may be about 0.5 parts to about 3 parts by weight, and in an embodiment, about 1 part to about 2 parts by weight, based on 100 parts by weight of the silicon-carbon secondary particles.

The coating layer may be coated, for example partially or entirely coated, on the surface of the silicon-carbon secondary particles. A coating method is not particularly limited, and any suitable coating method, for example, a dry coating method or a wet coating method may be used. Examples of the dry coating method are deposition, chemical vapor deposition (CVD), and the like. Examples of the wet coating method are dipping, spraying, and the like. However, embodiments are not limited thereto. Any suitable coating methods, including those used in the art may be used.

The thickness of the coating layer may be uniform or non-uniform depending on an amount of a coating material used therein. For example, the coating layer may have a thickness of about 0.1 nm to about 50 nm, and in an embodiment, about 0.5 nm to about 30 nm, and in another embodiment, about 1 nm to about 20 nm.

Hereinafter, a method of preparing a negative active material according to an embodiment will now be described. According to an aspect of the present disclosure, a method of preparing a negative active material includes: contacting, e.g., pressing and grinding, a silicon-based material and a first carbonaceous material to form a silicon-carbon primary particle having an apparent density of about 2 grams per cubic centimeter or greater; and thermally treating the silicon-carbon primary particle, a second carbonaceous material, and a foaming agent to form a plurality of silicon-carbon secondary particles, wherein a silicon-carbon secondary particle of the plurality of silicon-carbon secondary particles comprises a plurality of silicon-carbon primary particles and the second carbonaceous material.

In the preparation method of the negative active material, the silicon-based material, the first carbonaceous material, and the second carbonaceous material may be the same as described above in connection with an embodiment of the negative active material.

The first carbonaceous material and the second carbonaceous material may each independently include crystalline carbon, amorphous carbon, or a combination thereof. When the first mixture includes amorphous carbon, the preparation method may further include preparing the amorphous carbon by mixing the first mixture with a carbon precursor, for example, coal-tar pitch, mesophase pitch, petroleum pitch, coal-tar oil, intermediate crude oil (petroleum), organic synthetic pitch, or a polymer resin such as phenol resin, furan resin, or polyimide resin, and carbonizing a resulting mixture through thermal treatment to thereby obtain the amorphous carbon. The thermal treatment temperature for the carbonization may be adjusted within a range of about 500° C. to about 1,400° C. For example, to lower the degree of crystallinity of Si, the thermal treatment temperature may be in a range of about 500° C. to about 950° C.

The foaming agent included in the second mixture is a pore-forming agent to form the porous silicon-carbon secondary particles, and may include, for example, citric acid, stearic acid, oleic acid, oxalic acid, adipic acid, salicylic acid, benzoic acid, monochloroacetic acid, dibutyl phthalate (DBP), dioctyl phthalate (DOP), ethylene carbonate (EC), propylene carbonate (PC), petroleum pitch, coal-tar pitch, or a combination thereof. However, embodiments are not limited thereto. The foaming agent may form pores in the silicon-carbon secondary particles during the carbonization of organic material through the thermal treatment process. The porosity of the silicon-carbon secondary particles may be controlled by adjusting the amount of the foaming agent. An actual carbon fraction of the foaming agent after the carbonization may be about 10% or less, and in an embodiment, about 5% or less, and in another embodiment, about 2% or less.

The thermal treatment temperature of the secondary particles may be about 500° C. to 1000° C., but is not limited thereto. The thermal treatment temperature may be any suitable temperature at which carbonization of the foaming agent and optional amorphous carbon takes place.

The method may further include forming a coating layer on the surface of the obtained silicon-carbon secondary particles.

The coating layer may be formed by using a precursor solution of a fluoride compound, a metal oxide, a metal nitride, a phosphate compound, or a combination thereof.

The precursor solution may be obtained by mixing a precursor material able to form a coating layer of, for example, LiF, AlF$_3$, AlPO$_4$, Li$_3$AlF$_6$, Al$_2$O$_3$, ZrO$_2$, ZnO$_2$, TiO$_2$, SnO$_2$, AlPO$_4$, or a combination thereof, together with the silicon-carbon secondary particles. Then, the precursor solution may be thermally treated, for example, at about 300° C. to about 1,000° C. under a nitrogen atmosphere, to thereby form the coating layer on the surface of the silicon-carbon secondary particles.

According to another aspect of the present disclosure, a lithium secondary battery includes the above-defined negative active material in a negative electrode.

In an example embodiment, the lithium secondary battery may include a negative electrode including a negative active material according to any of the above-described embodiments; a positive electrode facing the negative electrode; and an electrolyte between the negative electrode and the positive electrode.

The negative electrode may include a negative active material according to one of the embodiments. For example, the negative active material, a binder, and optionally, a conducting agent may be mixed in a solvent to prepare a negative active material composition, the negative active material composition may then be molded into a shape or coated on a current collector such as a copper foil to form the negative electrode.

The negative electrode may further include, in addition to the negative active material according to any of the embodiments, an additional negative active material as is used in a lithium secondary battery. The additional negative active material may include a lithium metal, a metal alloyable with lithium, a transition metal oxide, a non-transition metal oxide, a carbonaceous material, or a combination thereof.

For example, the metal alloyable with lithium may include silicon (Si), tin (Sn), aluminum (Al), germanium (Ge), lead (Pb), bismuth (Bi), antimony (Sb), a Si—Y' alloy (wherein Y' is an alkali metal, an alkali earth metal, a Group 13 element, a Group 14 element, a Group 15 element, a Group 16 element, a transition metal, a rare earth element, or a combination thereof; but Y' is not Si), or a Sn—Y" alloy (wherein Y" is an alkali metal, an alkali earth metal, a Group 13 element, a Group 14 element, a Group 15 element, a Group 16 element, a transition metal, a rare earth element, or a combination thereof; but Y" is not Sn). The element Y' or Y" may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may include a lithium titanium oxide, a vanadium oxide, a lithium vanadium oxide, or a combination thereof.

For example, the non-transition metal oxide may be SnO$_2$, SiO$_x$ (wherein 0<x<2), or a combination thereof.

The carbonaceous material may include crystalline carbon, amorphous carbon, or a combination thereof. The crystalline carbon may include graphite, such as natural graphite or artificial graphite in amorphous, plate, flake, spherical, or fibrous form. The amorphous carbon may be soft carbon (carbon sintered at low temperatures), hard carbon, mesophase pitch carbide, sintered coke, or the like.

In an example embodiment, when a negative active material according to an embodiment and a carbonaceous material are used together, an oxidation reaction of the silicon-based alloy may be suppressed and a solid electrolyte interphase (SEI) layer may be effectively formed. Accordingly, a stable coating layer may be formed, and electrical conductivity of the lithium secondary battery may be improved, which may thereby further enhance charging and discharging characteristics of lithium.

A negative active material, including those available in the art, may be mixed with a negative active material according to an embodiment, coated on a surface of the negative active material, or be used in any other form of combination.

The binder used in the negative active material composition may facilitate binding between the negative active material and the conducting agent or binding of the negative active material composition to a current collector, wherein an amount of the binder may be from about 1 part to about 50 parts by weight based on 100 parts by weight of the negative active material. For example, the amount of the binder may be about 1 part to about 30 parts by weight, and in an embodiment, about 1 part to about 20 parts by weight, and in another embodiment, about 1 part to about 15 parts by weight. Examples of the binder include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polystyrene, poly(methyl methacrylate), polyaniline, acrylonitrile butadiene styrene, a phenol polymer or copolymer, an epoxy polymer or copolymer, polyethylene terephthalate, poly(tetrafluoroethylene), polyphenylene sulfide, polyamide-imide, polyetherimide, polyethylene sulfone, polyamide, polyacetal, polyphenylene oxide, polybutylene terephthalate, an ethylene-propylene-diene terpolymer (EPDM), a sulfonated EPDM, a styrene-butadiene rubber, a fluoride rubber, various copolymers of the binders herein, and the like.

The negative electrode may further optionally include a conducting agent to provide a conduction path to the negative active material to further improve electrical conductivity. As the conducting agent, any suitable material used in a lithium secondary battery may be used. Examples of the conducting agent include a carbonaceous material such as carbon black, acetylene black, Ketjen black, and carbon fiber (e.g., a vapor-grown carbon fiber); a metal-based material such as copper, nickel, aluminum silver, and the like, each of which may be used in powder or fibrous form; a conductive polymer such as a polyphenylene derivative; and a mixture thereof. An amount of the conducting agent may be appropriately controlled. For example, a weight ratio of the negative active material to the conducting agent may be about 99:1 to about 90:10.

The solvent may be N-methylpyrrolidone (NMP), acetone, water, and the like. An amount of the solvent may be in a range of about 1 part to about 10 parts by weight based on 100 parts by weight of the negative active material. When the amount of the solvent is within this range, an active material layer may be formed.

The current collector may have a thickness of from about 3 μm to about 500 μm. The current collector is not particularly limited as long as the current collector does not cause an undesirable chemical change in a battery and has conductivity. Examples of a material for forming the current collector are copper, stainless steel, aluminum, nickel, titanium, calcined carbon, copper and stainless steel that are surface-treated with carbon, nickel, titanium, silver, and the like, an alloy of aluminum and cadmium, and the like. An uneven microstructure may be formed on the surface of the current collector to enhance a binding force with the negative active material. The current collector may be used in any of various forms, including a film, a sheet, a foil, a net, a porous structure, a foam, a non-woven structure, and the like.

The prepared negative active material composition may be coated, for example directly coated, on a current collector to form a negative electrode plate. In an embodiment, the negative active material composition may be cast onto a separate support to form a negative active material film. This negative active material film may be separated from the support and laminated on a current collector, such as a copper foil, to obtain a negative electrode plate. The negative electrode is not particularly limited to the above-listed forms, and may have any other suitable form including those not listed above.

The negative active material composition may also be used not only to manufacture an electrode of a lithium secondary battery, but also, for example, to manufacture a printable battery by being printed on a flexible electrode substrate.

To manufacture a positive electrode, a positive active material composition may be prepared, for example, by mixing a positive active material, a conducting agent, a binder, and a solvent.

As the positive active material, any suitable lithium-containing metal oxide, including those available in the art, may be used.

For example, the positive active material may be a compound represented by one of the following formulae: $Li_aA_{1-b}B'_bD_2$ (wherein $0.90 \le a \le 1.8$, and $0 \le b \le 0.5$); $Li_aE_{1-b}B'_bO_{2-c}D_c$ (wherein $0.90 \le a \le 1.8$, $0 \le b \le 0.5$, and $0 \le c \le 0.05$); $LiE_{2-b}B'_bO_{4-c}D_c$ (wherein $0 \le b \le 0.5$ and $0 \le c \le 0.05$); $Li_aNi_{1-b-c}Co_bB'_cD_\alpha$ (wherein $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_2$ (wherein $0.90 \le a \le 1.8$, $0 \le b \le 0.5$, $0 \le c \le 0.05$, and $0 < \alpha < 2$); $Li_aNi_{1-b-c}Mn_bB'_cD_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F'_2$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dG_eO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$ and $0.001 \le b \le 0.1$); $Li_aCoG_bO_2$ (wherein $0.90 \le a \le 1.8$ and $0.001 \le b \le 0.1$); $Li_aMnG_bO_2$ (wherein $0.90 \le a \le 1.8$ and $0.001 \le b \le 0.1$); $Li_aMn_2G_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formula above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as positive active materials may have a surface coating layer (hereinafter, also referred to as "coating layer"). Alternatively, a mixture of a compound without a coating layer and a compound having a coating layer, the compounds being selected from the compounds listed above, may be used. In an embodiment, the coating layer may include an oxide, a hydroxide, an oxyhydroxide, an oxycarbonate, a hydroxycarbonate, or a combination thereof, as a coating element. In an embodiment, the compounds for forming the coating layer may be amorphous or crystalline. The coating element for forming the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In an embodiment, the coating layer may be formed using any suitable method (for example, spray coating, dipping, and the like) that does not adversely affect the physical properties of the positive active material when a compound of the coating element is used. These coating methods may be available to one of ordinary skill in the art, and thus a detailed description thereof will be omitted.

For example, $LiNiO_2$, $LiCoO_2$, $LiMn_xO_{2x}$ (wherein x=1, 2), $LiNi_{1-x}Mn_xO_2$ (wherein 0<x<1), $LiNi_{1-x-y}Co_xMn_yO_2$ (wherein 0≤x≤0.5 and 0≤y≤0.5), $LiFeO_2$, $V_2O_5$, $TiS$, $MoS$, or the like may be used as the coating layer.

The conducting agent, the binder, and the solvent used to prepare the positive active material composition may be the same as those used in the negative active material composition. In an embodiment, a plasticizer may be further added to the positive active material composition and the negative active material composition to form pores in a corresponding electrode plate. The amounts of the positive active material, the conducting agent, the binder, and the solvent may be the same as amounts used in suitable lithium secondary batteries, including those in the art.

A positive electrode current collector may have a thickness in a range of about 3 μm to about 500 μm, may be any of various current collectors having high conductivity and which do not cause a chemical change in a battery. Examples of the positive electrode current collector include stainless steel, aluminum, nickel, titanium, calcined carbon, and aluminum and stainless steel that are surface-treated with carbon, nickel, titanium, silver, and the like. The positive electrode current collector may have an uneven micro structure at its surface to enhance a binding strength thereof with the positive active material. The current collector may have any of various forms, including a film, a sheet, a foil, a net, a porous structure, a foam structure, a non-woven structure, and the like.

The prepared positive active material composition may be directly coated on the positive electrode current collector to form a positive electrode plate. In an embodiment, the positive active material composition may be cast onto a separate support to form a positive active material film. This positive active material film may be separated from the support and laminated on a positive electrode current collector, such as a copper foil, to obtain a positive electrode plate.

The positive electrode may be separated from the negative electrode by a separator. The separator may be any of various separators suitable for lithium secondary batteries. For example, the separator may include a material having a low resistance to migration of ions of an electrolyte and a good electrolyte solution-retaining capability. For example, the separator may include glass fiber, polyester, Teflon, polyethylene, polypropylene, polytetrafluoroethylene (PTFE), or a combination thereof, each of which may be nonwoven or woven. The separator may have a pore size in a range of about 0.01 μm to about 10 μm and a thickness in a range of about 5 to about 300 μm.

A lithium salt-containing non-aqueous electrolyte may include a non-aqueous electrolyte and lithium. Examples of the non-aqueous electrolyte are a non-aqueous electrolyte solution, an organic solid electrolyte, an inorganic solid electrolyte, and the like.

As the non-aqueous electrolyte solution, an aprotic organic solvent may be used. Examples of the aprotic organic solvent are N-methyl-2-pyrrolidinone, propylene carbonate, ethylene carbonate, butylene carbonate, dimethyl carbonate, diethyl carbonate, a fluorinated ethylene carbonate, ethylenemethylene carbonate, methylpropyl carbonate, ethyl propanoate, methyl acetate, ethyl acetate, propyl acetate, a dimethyl ester of gamma-butyrolactone, 1,2-dimethoxy ethane, tetrahydrofuran, 2-methyltetrahydrofuran, dimethylsulfoxide, 1,3-dioxane, formamide, dimethylformamide, dioxolane, acetonitrile, nitromethane, methyl formic acid, phosphoric acid triester, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionic acid, ethyl propionic acid, and the like.

Examples of the organic solid electrolyte include a polyethylene derivative, a polyethylene oxide derivative, a polypropylene oxide derivative, a phosphate ester polymer, poly-L-lysine, polyester sulfide, polyvinyl alcohol, poly fluorinated vinylidene, a polymer having a dissociable ionic group, and the like.

Examples of the inorganic solid electrolyte include nitrides, halides, and sulfides of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like.

The lithium salt may be any one of various lithium salts that are used in lithium secondary batteries, including those in the art. A material soluble in the non-aqueous electrolyte, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, a lower aliphatic carbonic acid lithium, lithium tetraphenylborate, and lithium imide, or a combination thereof, may be used.

A lithium secondary battery may be categorized as a lithium ion battery, a lithium ion polymer battery, or a lithium polymer battery, according to the type of separator and/or electrolyte included therein. A lithium secondary battery may be classified as a cylindrical-type, rectangular-type, coin-type, or pouch-type, according to a shape thereof. A lithium secondary battery may also be classified as either a bulk-type or thin film-type, according to a size thereof. The lithium batteries listed above may be secondary batteries.

Methods of manufacturing lithium batteries are widely known in the art, so a detailed description thereof will be omitted here.

Figure 4:
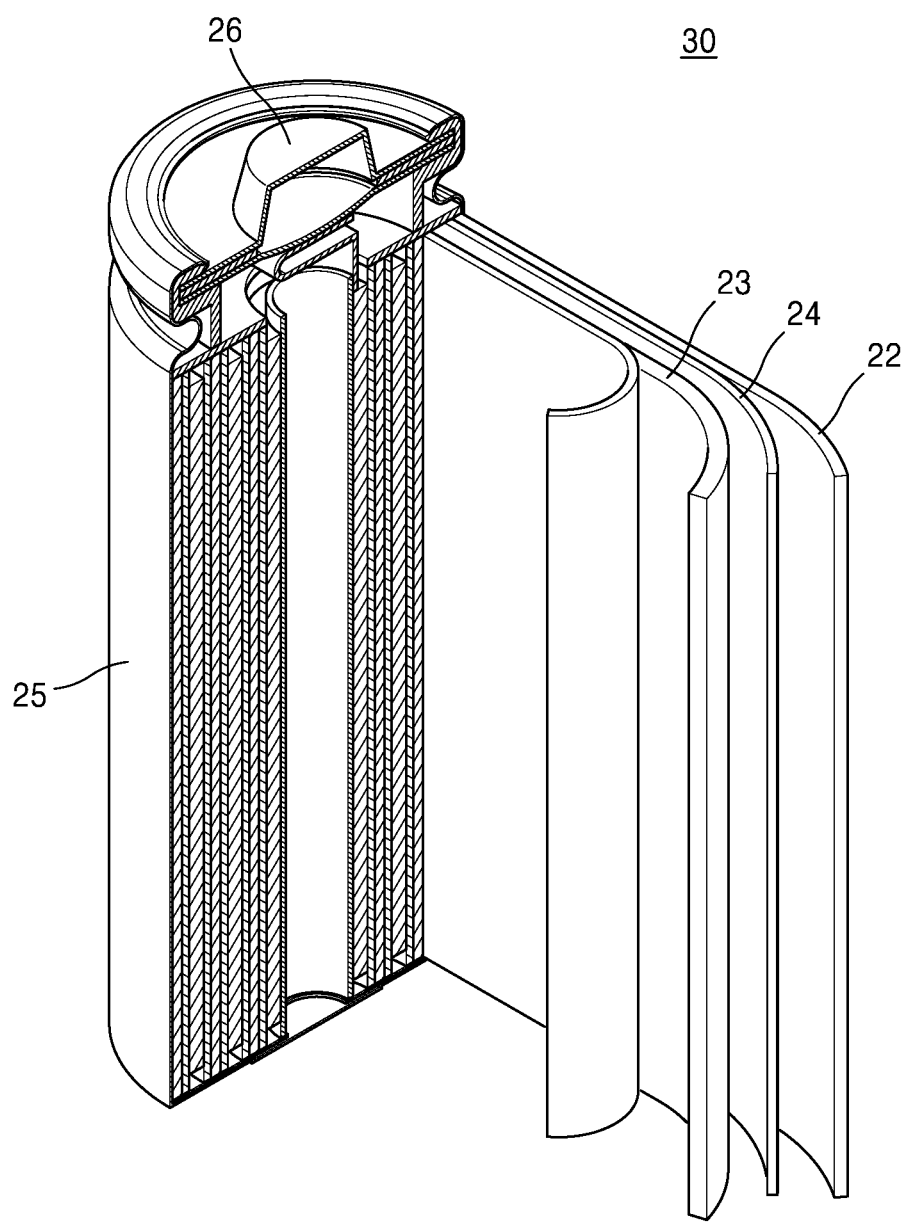
FIG. 4 is an schematic view illustrating a structure of a lithium secondary battery according to an embodiment.
Figure 5:
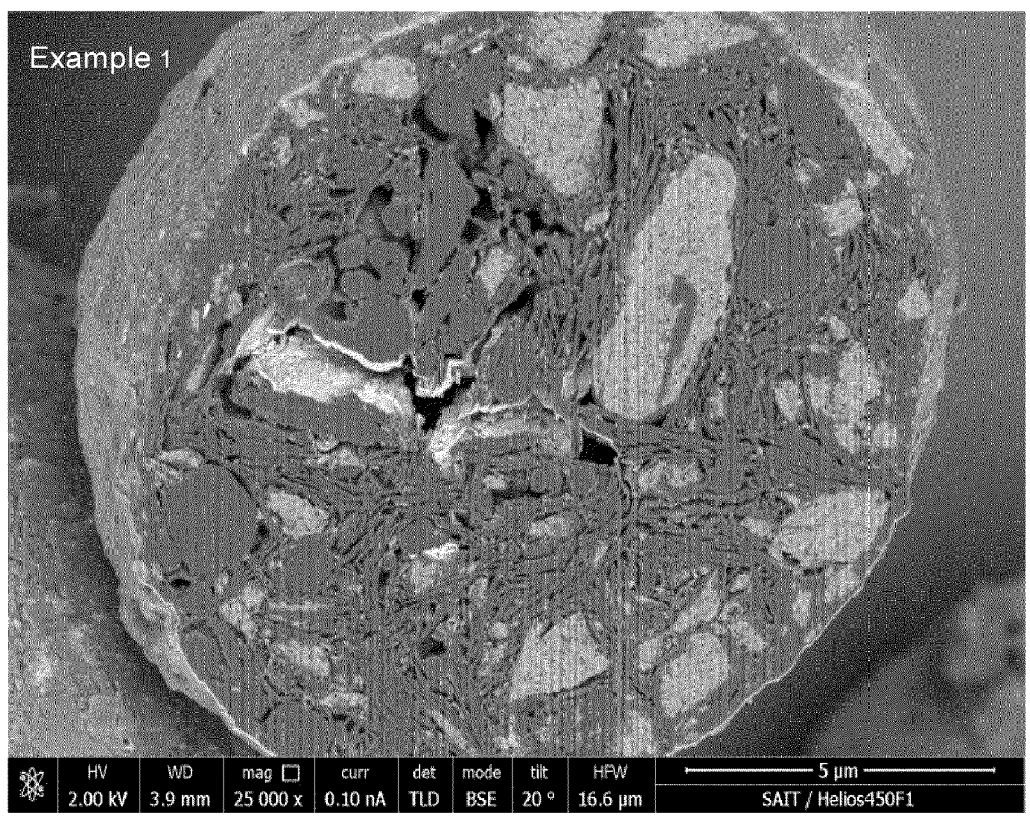
FIG. 5 is an SEM image at 25,000× magnification of an inner cross-section of the negative active material of Example 1, cut by FIB.
Figure 6:
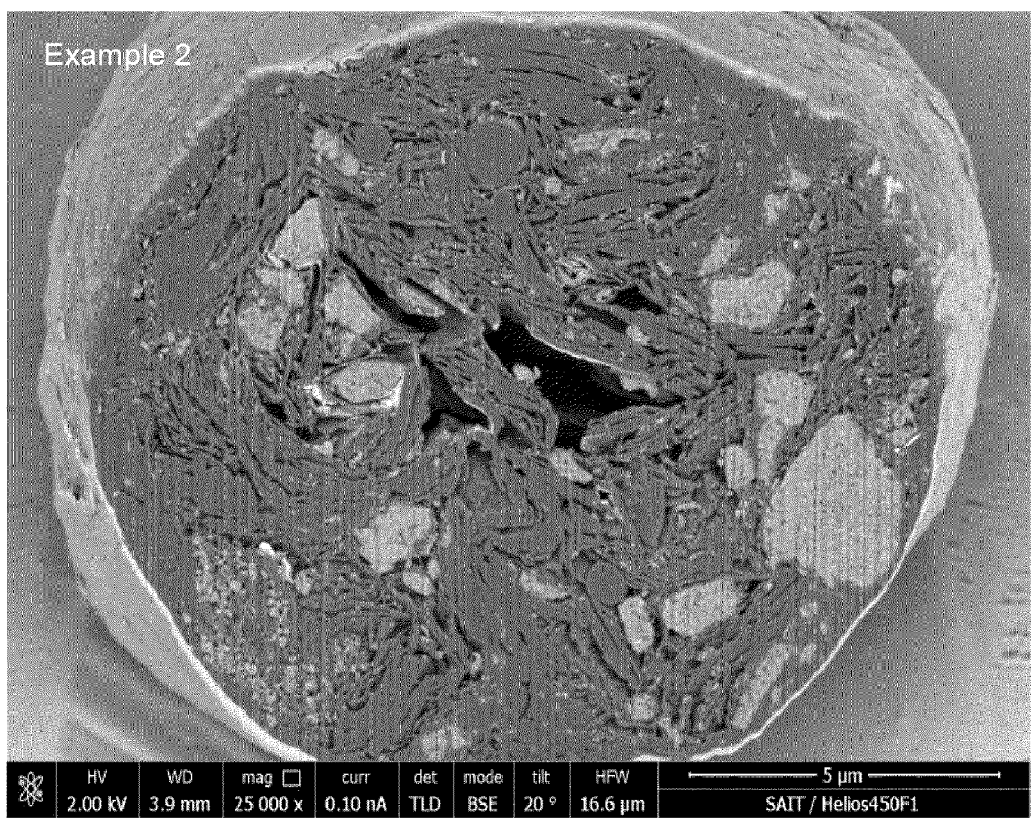
FIG. 6 is an SEM image at 25,000× magnification of an inner cross-section of a negative active material of Example 2, cut by FIB.
Figure 7:
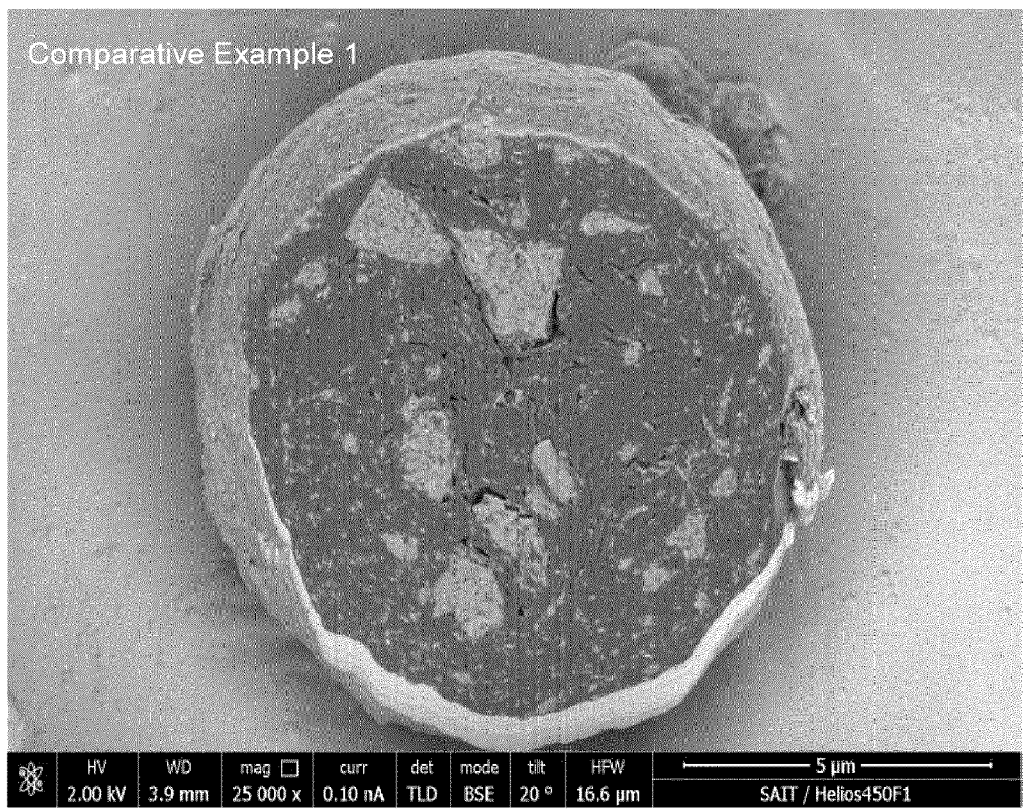
FIG. 7 is an SEM image at 25,000× magnification of an inner cross-section of a negative active material of Comparative Example 1, cut by FIB.
Figure 8:
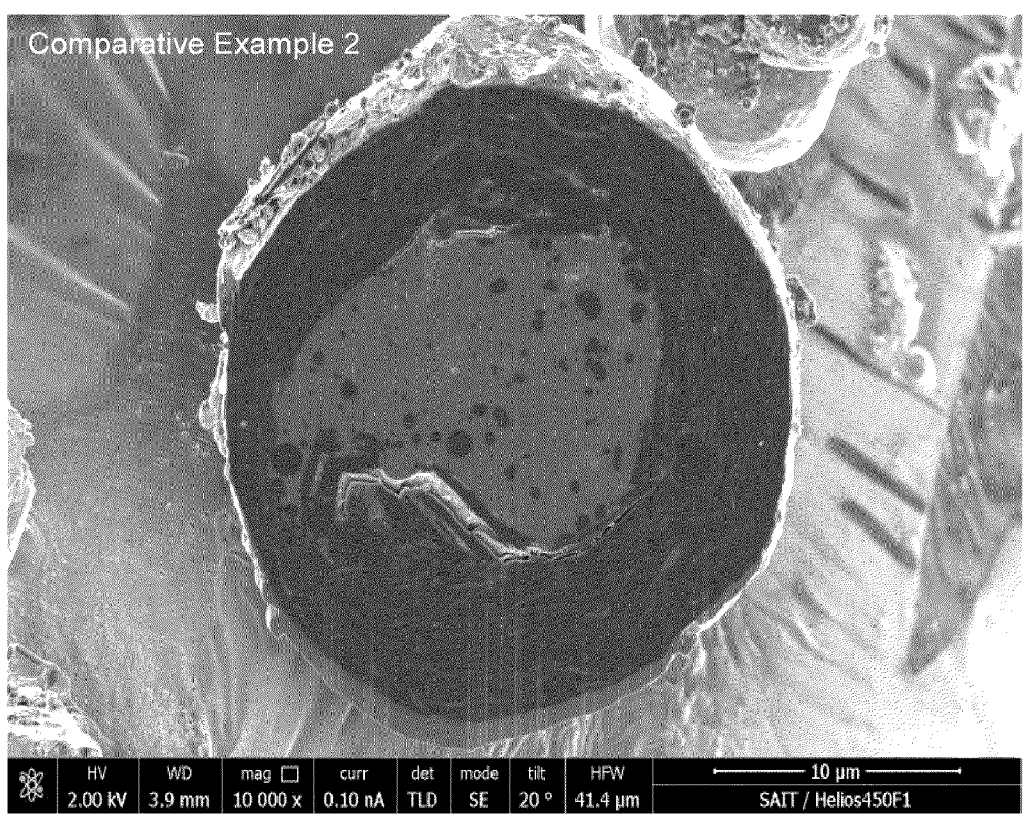
FIG. 8 is an SEM image at 25,000× magnification of an inner cross-section of a negative active material of Comparative Example 2, cut by FIB.

FIG. 4 is a schematic view illustrating a structure of a lithium secondary battery 30 according to an embodiment.

Referring to FIG. 4, the lithium secondary battery 30 may include a positive electrode 23, a negative electrode 22, and a separator 24 between the positive electrode 23 and the negative electrode 22. The positive electrode 23, the negative electrode 22, and the separator 24 may be wound or folded, and then encased in a battery case 25. Subsequently, an electrolyte may be injected into the battery case 25, followed by sealing of the battery case 25 with a cap assembly member 26 to thereby complete the manufacture of the lithium secondary battery 30. The battery case 25 may have a cylindrical, rectangular, or thin-film shape. The lithium secondary battery 30 may be, for example, a lithium ion battery.

A lithium secondary battery according to one of the above-described embodiments may be used as a power source for small devices, such as a mobile phone or a portable computer, or may also be used as a unit cell of a multi-cell battery module of a medium- or large-sized device.

Examples of the medium- or large-sized device are power tools; electric cars (referred to as xEV), including electric vehicles (EVs), hybrid electric vehicles (HEVs), and plug-in hybrid electric vehicles (PHEVs); and electric two-wheeled vehicles, including electric bicycles and electric scooters; electric golf carts; electric trucks; electric commercial vehicles; and power storage systems. However, embodiments are not limited thereto. Furthermore, a lithium secondary battery according to an embodiment may be used in any other applications that require high power output, high voltage, and high-temperature operation.

An embodiments of the present disclosure will now be described in detail with reference to the following examples. However, these examples are provided only for illustrative purposes and are not intended to limit the scope of the one or more embodiments of the present disclosure.

EXAMPLES

Example 1

(1) Preparation of Negative Active Material
A) Synthesis of Silicon-Carbon Primary Particles Having a Compact Structure A solution of a mixture of nanosilicon particles having an average particle diameter (D50) of about 100 nm and pitch carbon was dried by spray drying, mixed with graphite, and then pressed into pellets with pressing equipment; thermal treatment was then performed thereon at about 900° C. followed by grinding to prepare silicon-carbon primary particles having a compact structure and a size of about 1 μm to about 10 μm.

A composition ratio of silicon, pitch carbon, and graphite by weight was 40:20:40.
B) Synthesis of Silicon-Carbon Secondary Particles Having a Compact-Porous Composite Structure The prepared silicon-carbon primary particles having a compact structure, citric acid as a foaming agent, pitch carbon, and planar graphite were mixed together and ground using a ball mill, thus preparing silicon-carbon secondary particles having an average particle diameter of about 8 μm to about 22 μm. The prepared silicon-carbon secondary particles were thermally treated at about 500° C. for about 5 hours to prepare a Si/C composite active material, as a negative active material, having a compact-porous composite structure including pores among the compact-structured silicon-carbon primary particles.

A composition ratio of the silicon-carbon primary particles, citric acid, pitch carbon, and graphite by weight was about 80:5:5:10. An actual carbon proportion of the citric acid after carbonization was about 5%.
(2) Manufacture of Coin Half-Cell The prepared negative active material (Si/C composite active material), a carbon conducting agent (Ketjenblack), and a binder (ethylene carbonate and lithium polyacrylate (LiPAA)) were uniformly mixed at a ratio of about 93:1:6 by weight to prepare a negative electrode slurry.

The prepared negative electrode slurry was coated on a copper foil current collector having a thickness of about 10 μm to form a coated electrode plate, and the coated electrode plate was dried at about 120° C. for about 15 minutes and pressed to manufacture a positive electrode. The negative electrode had a specific capacity of about 550 mAh/g and an electrode density of about 1.5 g/cc.

A CR2032-type coin half-cell was manufactured using the negative electrode, a lithium metal as a counter electrode, a polytetrafluoroethylene (PTFE) separator, and an electrolyte including a 1.0 molar (M) solution of $LiPF_6$ dissolved in a mixed solvent of ethylene carbonate (EC), diethyl carbonate (DEC), and fluoroethyl carbonate (FEC) at a ratio of about 5:70:25 by volume.
(3) Manufacture of Coin Full Cell The prepared negative active material (Si/C composite active material), a carbon conducting agent (Ketjenblack), and a binder (lithium polyacrylate, LiPAA) were uniformly mixed at a ratio of about 93:1:6 by weight to prepare a negative electrode slurry.

The prepared negative electrode slurry was coated on a copper foil current collector having a thickness of about 10 μm, and the resulting coated electrode plate was dried at about 120° C. for about 15 minutes and pressed to manufacture a negative electrode. The negative electrode had a specific capacity of about 550 mAh/g and an electrode density of about 1.5 g/cc.

$LiNi_{0.6}Co_{0.2}Mn_{0.2}O_2$ as a positive active material and LiPAA as a binder were mixed in a ratio of about 1:1 by weight to prepare a positive electrode slurry. The positive electrode slurry was coated on an aluminum foil current collector having a thickness of about 12 μm, and the resulting coated electrode plate was dried at about 120° C. for about 15 minutes and pressed to manufacture a positive electrode.

A CR2032-type coin full cell was manufactured using the positive electrode, the negative electrode, a PTFE separator, and an electrolyte including a 1.3 M solution of $LiPF_6$ dissolved in a mixed solvent of EC, ethylmethyl carbonate (EMC), and DEC in a ratio of about 5:70:25 by volume.

Example 2

A negative active material was prepared as follows, and a coin half-cell and a coin full cell were manufactured in the same manner as in Example 1.
(1) Preparation of Negative Active Material
A) Synthesis of Silicon-Carbon Primary Particles Having a Compact Structure Silicon-carbon primary particles having a compact structure were synthesized in the same manner as in Example 1.

B) Synthesis of Silicon-Carbon Secondary Particles Having a Compact-Porous Composite Structure The prepared silicon-carbon primary particles having a compact structure, styrene-acrylonitrile (SAN) as a foaming agent, pitch carbon, and planar graphite were mixed together and ground using a ball mill, to thus prepare silicon-carbon secondary particles having an average particle diameter of about 8 μm to about 22 μm. The prepared silicon-carbon secondary particles were thermally treated at about 500° C. for about 5 hours to prepare a Si/C composite active material having a compact-porous composite structure including pores among the compact-structured silicon-carbon primary particles.

A composition ratio of the silicon-carbon primary particles, SAN polymer, pitch carbon, and graphite was about 60:5:5:30 by weight. An actual carbon proportion of the SAN polymer after carbonization was about 2%.

Example 3

A negative active material was prepared as follows, and a coin half-cell and a coin full cell were manufactured in the same manner as in Example 1.
(1) Manufacture of Negative Active Material
A) Synthesis of Silicon-Carbon Primary Particles Having a Compact Structure Silicon-carbon primary particles having a compact structure were synthesized in the same manner as in Example 1.
B) Synthesis of Silicon-Carbon Secondary Particles Having a Compact-Porous Composite Structure Silicon-carbon secondary particles having a compact-porous composite structure were synthesized in the same manner as in Example 1.
C) Coating Layer Formation The silicon-carbon secondary particles having a compact-porous composite structure prepared according to Example 1 were added to a solution of $Al(NO_3)_3 \cdot 9H_2O$ dissolved in distilled water and mixed together to prepare a solution (a). A solution (b) was prepared by dissolving an appropriate amount of $NH_4F$ in distilled water.

The solution (b) was slowly added to the solution (a) and reacted at about 80° C. for about 5 hours to coat $AlF_3$ on the surface of the silicon-carbon secondary particles having the compact-porous composite structure. After completion of the reaction, the resulting solution was evaporated to remove the solvent, and the $AlF_3$-coated Si/C secondary particles were thermally treated under a nitrogen ($N_2$) atmosphere at about 500° C. for about 5 hours.

The amount of $AlF_3$ coated on the Si/C secondary particles was controlled to be about 1 wt %, based on a total weight of the Si/C secondary particles.

Example 4

A negative active material, a coin half-cell, and a coin full cell were prepared in the same manner as in Example 3, except that the amount of $AlF_3$ used for coating was controlled to be about 2 wt % based on the weight of the Si/C secondary particles.

Comparative Example 1

A negative active material was prepared as follows, and a coin half-cell and a coin full cell were manufactured in the same manner as in Example 1.

(1) Manufacture of Negative Active Material
A) Synthesis of Silicon-Carbon Primary Particles Having a Compact Structure Silicon-carbon primary particles having a compact structure were synthesized in the same manner as in Example 1.
B) Synthesis of Silicon-Carbon Secondary Particles Having a Compact-Porous Composite Structure The prepared silicon-carbon primary particles having a compact structure, pitch carbon, and planar graphite were mixed together and ground using a ball mill to thus prepare silicon-carbon secondary particles having an average particle diameter of about 8 μm to about 22 μm. The prepared silicon-carbon secondary particles were thermally treated at about 500° C. for about 5 hours to prepare a Si/C composite active material having a compact-porous composite structure exclusively including the compact-structured silicon-carbon primary particles without pores.

A composition ratio of the silicon-carbon primary particles, pitch carbon, and graphite was about 80:10:10 by weight.

Comparative Example 2

Silicon-carbon primary particles having a compact structure and synthesized according to Example 1 were exclusively used as a negative active material. A coin half-cell and a coin full cell were manufactured in the same manner as in Example 1.

Comparative Example 3

Silicon-carbon primary particles having a porous structure were prepared as follows.

A solution of a mixture of nanosilicon particles having an average particle diameter (D50) of about 100 nm and pitch carbon was dried by spray drying, and then mixed with graphite, thermally treated at about 900° C. without being pressed, and ground to prepare silicon-carbon primary particles having a compact structure and a size of about 1 μm to about 10 μm.

The prepared silicon-carbon primary particles having a porous structure were exclusively used as a negative active material. A coin half-cell and a coin full cell were manufactured in the same manner as in Example 1.

Evaluation Example 1: Scanning Electron Microscopy (SEM) of Particle Cross-Section The negative active materials of Examples 1 and 2 and Comparative Examples 1 to 3 were sliced using focused ion beam bombardment (FIB) to obtain inner cross-sections, which were then analyzed using a scanning electron microscope (SEM) at 25,000× magnification. The resulting SEM images are shown in FIGS. 5 to 9.

Figure 9:
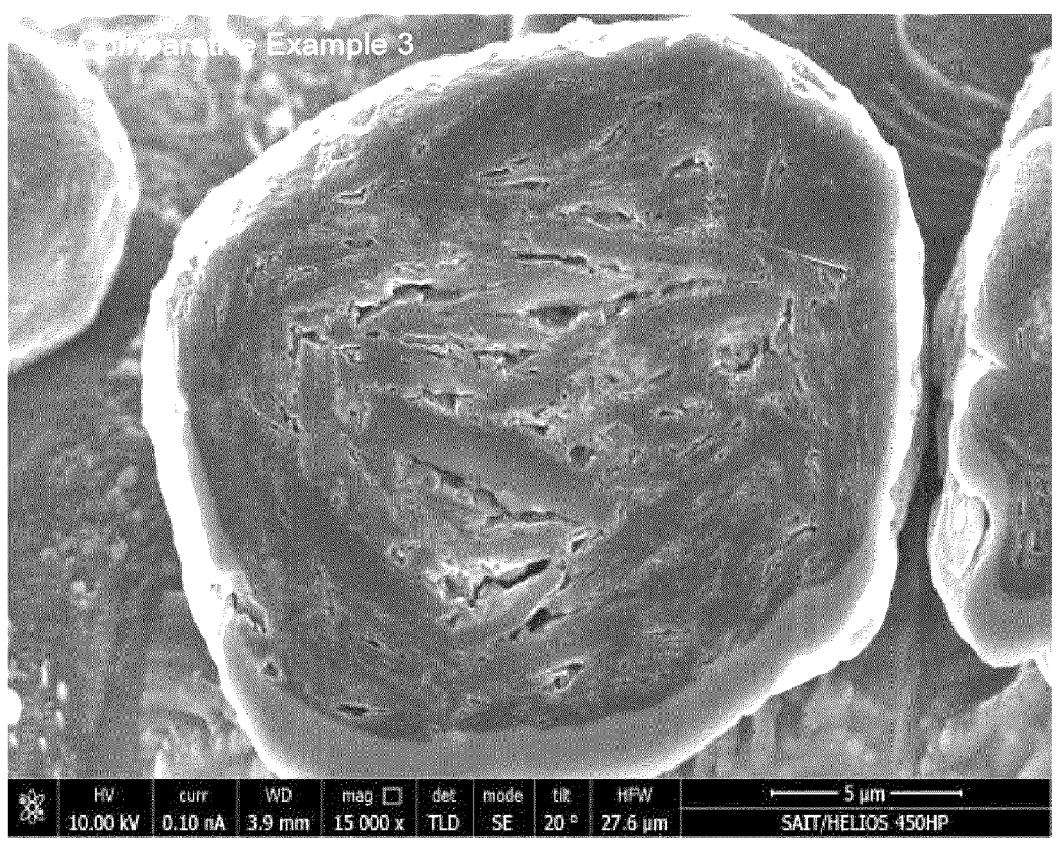
FIG. 9 is an SEM image at 25,000× magnification of an inner cross-section of a negative active material of Comparative Example 3, cut by FIB.

Referring to FIGS. 5 to 9, the negative active materials of Examples 1 and 2 had silicon-carbon secondary particles having a compact-porous composite structure (FIGS. 5 and 6, respectively), the negative active material of Comparative Example 1 was found to include the compact silicon-carbon secondary particles since no foaming agent was used (FIG. 7), the negative active material of Comparative Example 2 was found to include the compact silicon-carbon primary particles (FIG. 8), and the negative active material of Comparative Example 3 was found to include the porous silicon-carbon primary particles (FIG. 9).

Evaluation Example 2: Determination of Effect of Compact Structure

To determine an effect of the compact structure on the negative active materials, a discharge capacity and a capacity retention of each of the coin full cells of Comparative Examples 2 and 3 were measured while the coin full cells were charged and discharged at room temperature (ca. 25° C.) with a constant current of a 1 C rate in a voltage range of about 2.5 V to about 4.1 V with respect to lithium metal.

A charging and discharging cycle was repeated 100 times, and a capacity retention (CR) at room temperature, which is defined by Equation 1, was calculated.

Capacity retention [%]=[Discharge capacity after 100 charging and discharging cycles/Discharge capacity at $1^{st}$ cycle]×100%    Equation 1

An electrode expansion was calculated from Equation 2 by respectively measuring a thickness of a negative electrode before assembling into the coin full cell and a thickness of the negative electrode after disassembling the battery after 100 charge and discharge cycles and then removing the electrolyte.

Electrode expansion [%]=[thickness of anode after 100 charging and discharging cycles/thickness of unused anode]×100%    Equation 2

An initial capacity efficiency (I.C.E.), defined as "Discharge capacity at $1^{st}$ cycle/Charge capacity at $1^{st}$ cycle", a capacity retention according to Equation 1, and an electrode expansion according to Equation 2 (at a specific capacity of 825 mAh/cm$^3$) after intercalation of lithium at 0.1 C were measured.

Figure 10:
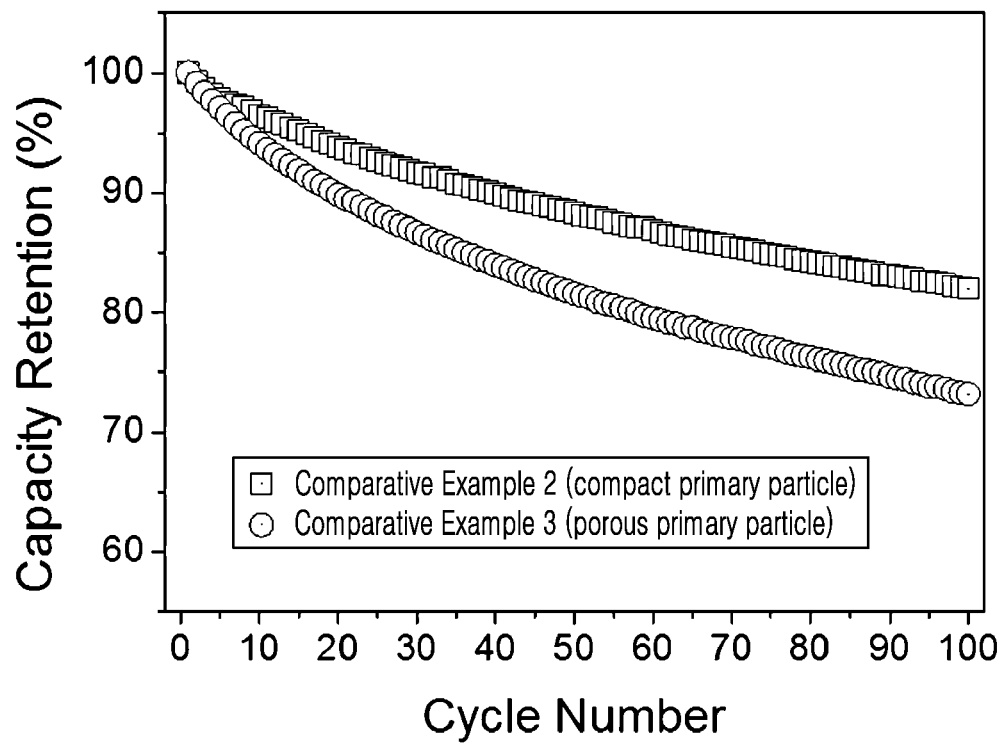
FIG. 10 is a graph of capacity retention (%) versus cycle number (n) illustrating capacity retention relative to the number of charge/discharge cycles of coin half cells manufactured in Comparative Examples 2 and 3.

The capacity retention of the coin full cells of Comparative Examples 2 and 3 at each cycle (n) are represented in FIG. 10. The initial capacity efficiency, capacity retention, and electrode expansion after 100 charge/discharge cycles for each of the coin full cells of Comparative Examples 2 and 3 are shown in Table 1.

TABLE 1

| Sample | Apparent density (g/cc) | 1$^{st}$ (0.1 C) Specific capacity$^{\ddagger}$ (mAh/g) | I.C.E (%) | Capacity retention (%) | Electrode expansion (%) |
|---|---|---|---|---|---|
| Comparative Example 2 (Compact primary particle) | 2.26 | 590 | 85 | 82 | 45 |
| Comparative Example 3 (Porous primary particle) | 1.72 | 558 | 80 | 73 | 45 |

$^{\ddagger}$specific capacity at 1st cycle

Referring to FIG. 10 and Table 1, it is found that the more compact the Si/C composite active material, the better the initial capacity efficiency and lifespan characteristics become.

Evaluation Example 3: Identification of Effect of Compact-Porous Composite Structure To identify an effect of the compact-porous composite structure of negative active materials, the coin half-cells of Examples 1 and 2 and Comparative Examples 1 and 2 were charged and discharged in the same manner as in Evaluation Example 2.

Figure 11:
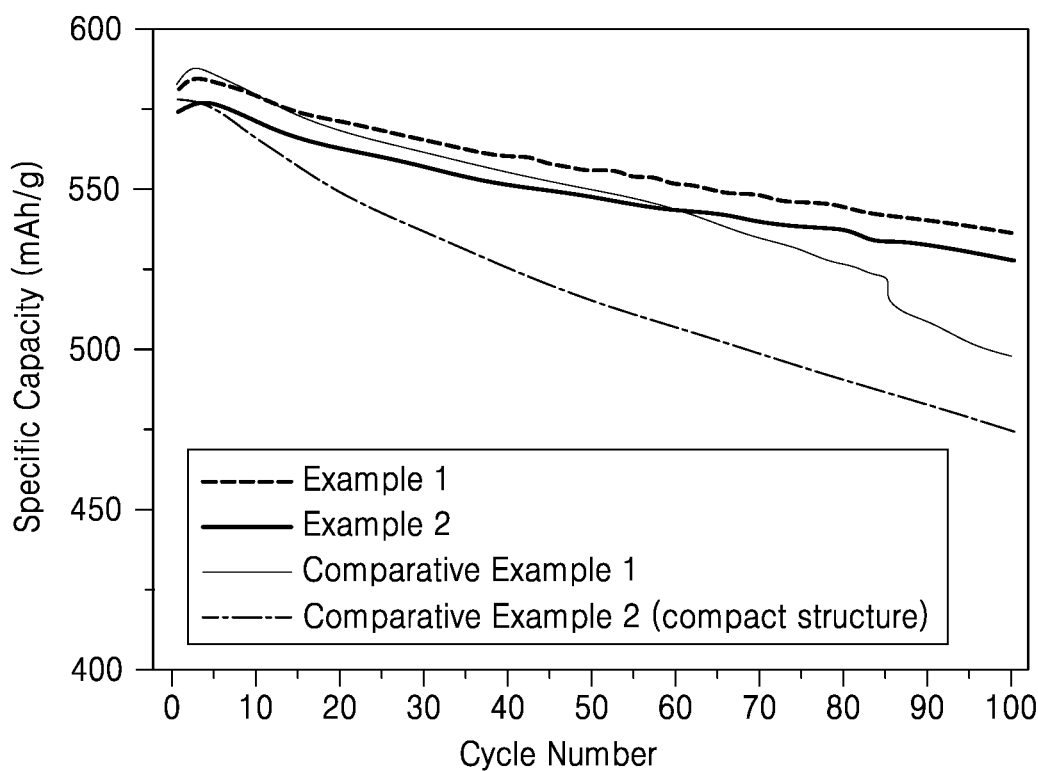
FIG. 11 is a graph of specific capacity (milliampere hours per gram, mAh/g) versus cycle number (n) illustrating specific capacity relative to the number of charge/discharge cycles of the coin half cells manufactured in Examples 1 and 2 and Comparative Examples 1 and 2.
Figure 12:
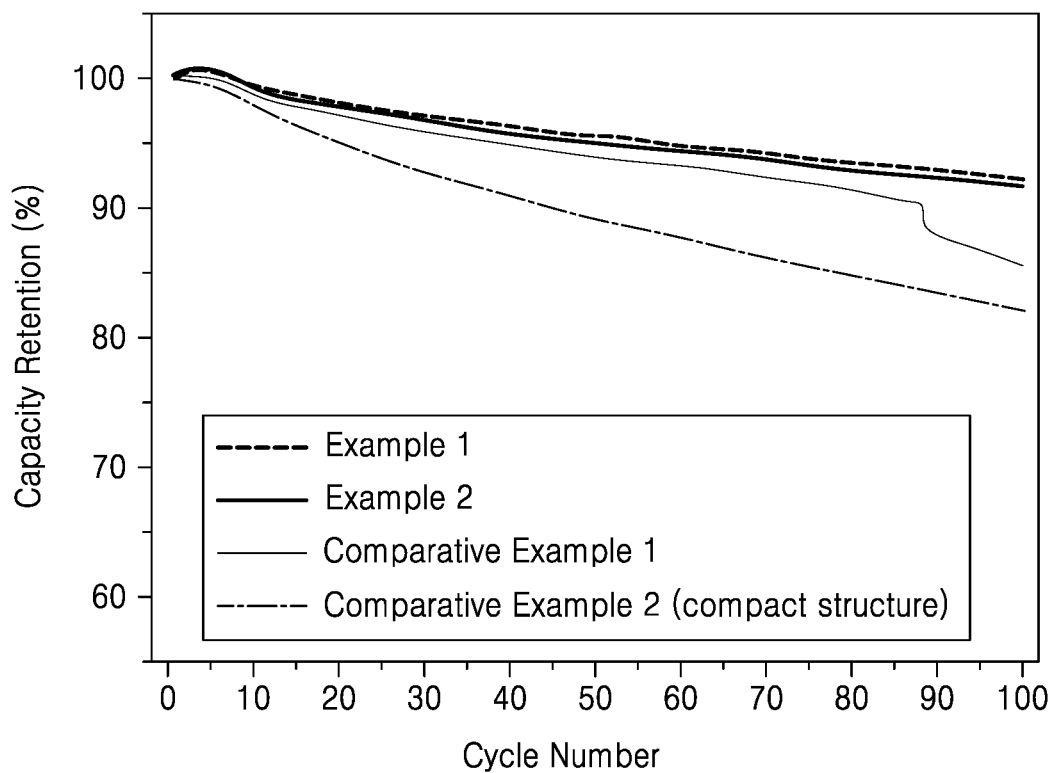
FIG. 12 is a graph of capacity retention (%) versus cycle number (n) illustrating capacity retention relative to the number of charge/discharge cycles of the coin half cells manufactured in Examples 1 and 2 and Comparative Examples 1 and 2.
Figure 13:
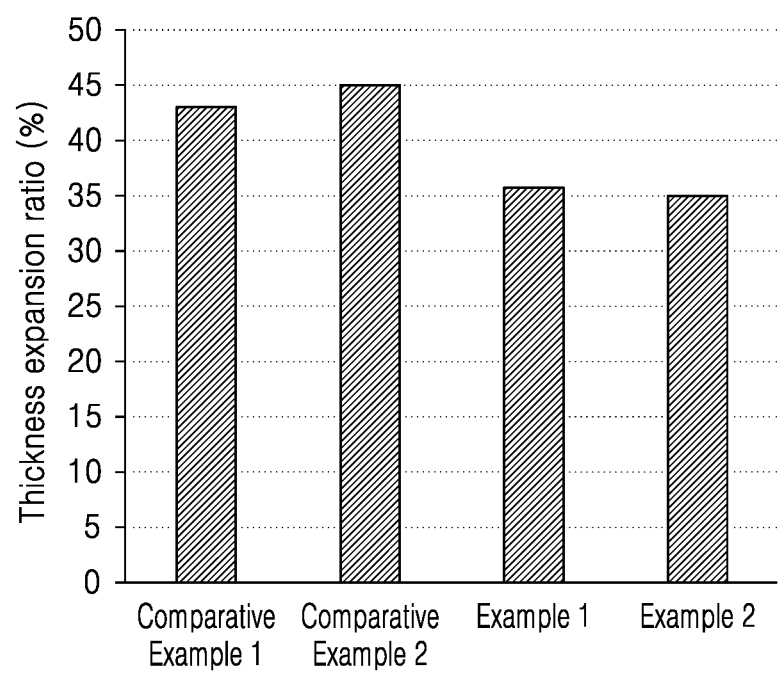
FIG. 13 is a bar graph of thickness expansion (%) versus sample identity illustrating electrode (thickness) expansion in the half coin cells manufactured in Examples 1 and 2 and Comparative Examples 1 and 2.

The discharge specific capacity, capacity retention, and electrode expansion at each cycle (n) of each of the coin half-cells of Examples 1 and 2, and Comparative Examples 1 and 2, are shown in FIGS. 11, 12, and 13, respectively.

The apparent density, specific capacity, capacity retention, and electrode expansion after 100 charge/discharge cycles for each of the coin half-cells of Examples 1 and 2, and Comparative Examples 1 and 2, are shown in Table 2.

TABLE 2

| Sample | Apparent density (g/cc) | 1$^{st}$ (0.1 C) specific capacity$^{\ddagger}$ (mAh/g) | Capacity retention (%) | Electrode expansion (%) |
|---|---|---|---|---|
| Example 1 (Compact-porous) | 1.89 | 595 | 92 | 36 |
| Example 2 (Compact-porous) | 1.87 | 581 | 90 | 35 |
| Comparative Example 1 (Compact secondary particle) | 2.02 | 598 | 86 | 43 |
| Comparative Example 2 (Compact primary particle) | 2.26 | 590 | 82 | 45 |

$^{\ddagger}$specific capacity at 1st cycle

Referring to FIGS. 11 to 13 and Table 2, the Si/C composite active materials having a compact-porous composite structure (Examples 1 and 2) were found to have an electrode expansion reduced by up to about 10% (based on an electrode having 825 mAh/cc) and a lifetime increase of about 10%, as compared with the active materials having a compact structure (Comparative Examples 1 and 2).

Evaluation Example 4: Identification of Coating Effect

To identify an effect of forming a coating layer on the surface of a Si/C composite active material having a compact-porous composite structure, the coin full cells of Examples 1 to 3 were charged and discharged in the same manner as in Evaluation Example 2.

Figure 14:
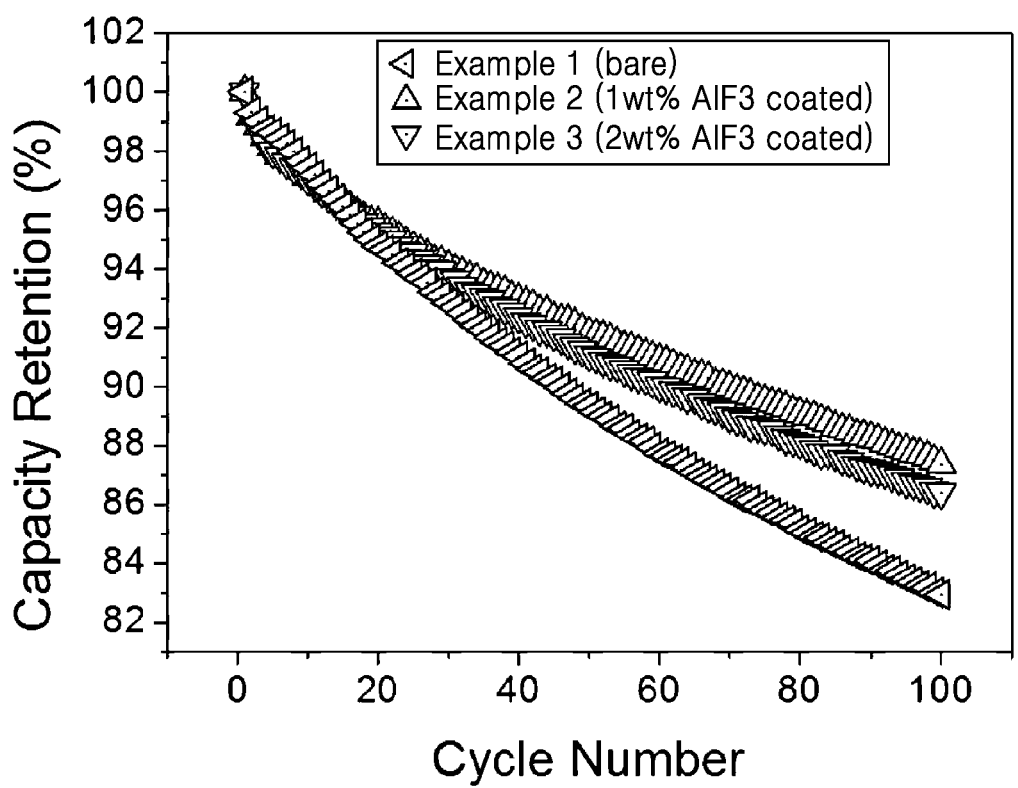
FIG. 14 is a graph of capacity retention (%) versus cycle number (n) illustrating specific capacity retention relative to the number of charge/discharge cycles of the coin full cells manufactured in Examples 1 to 3.

The capacity retention at each cycle of the coin full cells of Examples 1 to 3 is shown in FIG. 14. The specific capacity and capacity retention after 100 charge/discharge cycles are shown in Table 3.

TABLE 3

| Sample | 1$^{st}$ (0.1 C) Specific capacity$^{\ddagger}$ (mAh/g) | Capacity retention (%) |
|---|---|---|
| Example 1 (Bare) | 590 | 82 |
| Example 2 (1 wt % AlF$_3$ coated) | 550 | 87 |
| Example 3 (2 wt % AlF$_3$ coated) | 536 | 86 |

$^{\ddagger}$specific capacity at 1st cycle

Referring to FIG. 14 and Table 3, when the AlF$_3$ coating layer was formed, the capacity retention after 100 charge/discharge cycles was improved by about 5%, and lifespan characteristics were also improved.

As described above, according to the one or more embodiments, a negative active material as a Si/C composite active material having a compact-porous composite structure may reduce an electrode expansion and improve lifespan characteristics of a lithium secondary battery.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative active material comprising: a porous silicon-carbon secondary particle comprising
   a plurality of silicon-carbon primary particles comprising
      a silicon material, and
      a first carbonaceous material,
      wherein an apparent density of a silicon-carbon primary particle of the plurality of silicon-carbon primary particles is about 2 grams per cubic centimeter to about 2.3 grams per cubic centimeter; and
   a second carbonaceous material,
   wherein the second carbonaceous material is disposed on the plurality of silicon-carbon primary particles, and
   wherein the silicon-carbon primary particle has a porosity of 0% to about 10%, based on a total volume of the silicon carbon primary particle, and
   wherein an apparent density of the silicon-carbon secondary particle is about 1.6 grams per cubic centimeter to about 2 grams per cubic centimeter.

2. The negative active material of claim 1, wherein the silicon-carbon primary particle has a porosity of about 1% to about 10%, based on a total volume of the silicon carbon primary particle.

3. The negative active material of claim 1, wherein the silicon-carbon primary particle has an average pore diameter of about 5 nanometers to about 2 micrometers.

4. The negative active material of claim 1, wherein the silicon-carbon primary particle has a specific surface area of about 6 square meters per gram to about 70 square meters per gram.

5. The negative active material of claim 1, wherein the silicon-carbon secondary particle has a porosity of about 20% to about 50%.

6. The negative active material of claim 1, wherein the silicon-carbon secondary particle has a specific surface area of about 3 square meters per gram to about 20 square meters per gram.

7. The negative active material of claim 1,
   wherein the silicon-carbon primary particle has an average particle diameter of about 0.1 micrometer to about 15 micrometers, and
   wherein the silicon-carbon secondary particle has an average particle diameter of about 5 micrometers to about 25 micrometers.

8. The negative active material of claim 1, wherein an amount of silicon in the silicon-carbon primary particle is about 50 weight percent to about 99 weight percent, based on a total weight of the silicon-carbon primary particle, and
   wherein the amount of silicon in the silicon-carbon secondary particle is about 30 weight percent to about 70 weight percent, based on a total weight of the silicon-carbon secondary particle.

9. The negative active material of claim 1,
   wherein the silicon material has a nanostructure comprising silicon, and
   wherein the nanostructure is in the form of a nanoparticle, a nanowire, a nanorod, a nanofiber, a nanoporous body, a nanotemplate, a nanoneedle, or a combination thereof.

10. The negative active material of claim 1, wherein the first carbonaceous material and the second carbonaceous material each independently comprise a crystalline carbon, an amorphous carbon, or a combination thereof.

11. The negative active material of claim 10, wherein the crystalline carbon comprises natural graphite, artificial graphite, expandable graphite, graphene, carbon nanotubes, or a combination thereof.

12. The negative active material of claim 1, further comprising a coating layer on a surface of the silicon-carbon secondary particle.

13. The negative active material of claim 12, wherein the coating layer comprises a fluoride compound, an inorganic oxide, a phosphate compound, or a combination thereof.

14. The negative active material of claim 12, wherein the coating layer comprises LiF, $AlF_3$, $AlPO_4$, $Li_3AlF_6$, $Al_2O_3$, $ZrO_2$, $ZnO_2$, $TiO_2$, $SnO_2$, $AlPO_4$, or a combination thereof.

15. The negative active material of claim 12, wherein an amount of the coating layer is about 0.1 part to about 5 parts by weight, based on 100 parts by weight of the silicon-carbon secondary particle.

16. The negative active material of claim 1, wherein the silicon-carbon secondary particle has a structure in which the silicon-carbon primary particle is dispersed in the second carbonaceous material.

17. A lithium secondary battery comprising the negative active material of claim 1.

18. The negative active material of claim 1, wherein an amount of silicon in the silicon-carbon primary particle is about 55 weight percent to about 99 weight percent, based on a total weight of the silicon-carbon primary particle.

19. A method of preparing a negative active material, the method comprising:
   contacting a silicon material and a first carbonaceous material to form a silicon-carbon primary particle having an apparent density of about 2 grams per cubic centimeter to about 2.3 grams per cubic centimeter; and
   thermally treating the silicon-carbon primary particle a second carbonaceous material, and a foaming agent to form porous silicon-carbon secondary particle,
   wherein the silicon-carbon secondary particle comprises a plurality of silicon-carbon primary particles and the second carbonaceous material, and
   wherein the silicon-carbon primary particle has a porosity of 0% to about 10%, based on a total volume of the silicon carbon primary particle, and
   wherein an apparent density of the silicon-carbon secondary particle is about 1.6 grams per cubic centimeter to about 2 grams per cubic centimeter.

20. The method of claim 19, wherein the contacting the silicon material and the first carbonaceous material comprises pressing and grinding.

21. The method of claim 20, wherein the foaming agent comprises citric acid, stearic acid, oleic acid, oxalic acid, adipic acid, salicylic acid, benzoic acid, monochloroacetic acid, dibutyl phthalate, dioctyl phthalate, ethylene carbonate, propylene carbonate, petroleum pitch, coal-tar pitch, or a combination thereof.

22. The method of claim 19, wherein the thermal treating is performed at about 500° C. to about 1,000° C.

23. The method of claim 19, further comprising forming a coating layer on a surface of the silicon-carbon secondary particle.

\* \* \* \* \*